(12) United States Patent
Arunachalam et al.

(10) Patent No.: US 11,187,566 B2
(45) Date of Patent: Nov. 30, 2021

(54) SAFETY INCIDENT DETECTION AND REPORTING THROUGH A CONNECTED EVC (ELECTRONIC VOLUME CORRECTOR)

(71) Applicant: Honeywell International Inc., Morris Plains, NJ (US)

(72) Inventors: Soundari Arunachalam, Karnataka (IN); Dinesh Kumar Kn, Karnataka (IN); Suresh Kumar Palle, Karnataka (IN); Pierre Dufour, Cincinnati, OH (US)

(73) Assignee: Honeywell International Inc., Charlotte, NC (US)

( * ) Notice: Subject to any disclaimer, the term of this patent is extended or adjusted under 35 U.S.C. 154(b) by 451 days.

(21) Appl. No.: 16/018,392

(22) Filed: Jun. 26, 2018

(65) Prior Publication Data
US 2019/0120677 A1    Apr. 25, 2019

Related U.S. Application Data

(60) Provisional application No. 62/574,991, filed on Oct. 20, 2017.

(51) Int. Cl.
*G08B 13/04*    (2006.01)
*G01F 25/00*    (2006.01)
(Continued)

(52) U.S. Cl.
CPC .......... *G01F 15/046* (2013.01); *G01F 15/063* (2013.01); *G01F 25/0053* (2013.01);
(Continued)

(58) Field of Classification Search
CPC ...... G01F 15/007; G01F 15/046; G01F 15/04; G08B 13/04
See application file for complete search history.

(56) References Cited

U.S. PATENT DOCUMENTS 4,390,956 A    6/1983    Cornforth et al.
4,489,290 A    12/1984    Warner
(Continued)

FOREIGN PATENT DOCUMENTS

EP    0236681 A2    9/1987
EP    0309644 A2    5/1989

OTHER PUBLICATIONS

"Electronic Volume Corrector EK230", Feb. 2006, Elster-Instromet GmbH, D-55252 Mainz-Kastel.
(Continued)

*Primary Examiner* — Eman A Alkafawi
(74) *Attorney, Agent, or Firm* — Ortiz & Lopez, PLLC; Kermit D. Lopez; Luis M. Ortiz

(57) ABSTRACT

Safety monitoring systems and methods include a mesh communications network and an EVC (Electronic Volume Corrector) installed in one or more gas distribution components and/or industrial metering components in a gas distribution station and/or an industrial metering station. A group of sensors can be configured, which includes, for example, a gas leak sensor, a pressure transducer, a temperature transducer, an intrusion sensor and/or other types of sensors. Such sensors can be located within the gas distribution station and/or industrial metering station. The sensors communicate wirelessly with the EVC and the gas distribution and/or industrial metering components through the mesh communications network.

17 Claims, 4 Drawing Sheets

(51) Int. Cl.
  *G01F 15/06* (2006.01)
  *G08B 21/18* (2006.01)
  *G01F 15/04* (2006.01)
  *H04W 4/80* (2018.01)

(52) U.S. Cl.
  CPC ........... *G08B 13/04* (2013.01); *G08B 21/182* (2013.01); *H04W 4/80* (2018.02)

(56) References Cited

U.S. PATENT DOCUMENTS

| | | | |
|---|---|---|---|
| 4,910,519 | A | 3/1990 | Duell et al. |
| 5,323,141 | A | 6/1994 | Petek |
| 5,917,410 | A | 6/1999 | Cecic et al. |
| 7,295,934 | B2 | 11/2007 | Hairston |
| 7,349,813 | B2 | 3/2008 | Gutierrez et al. |
| 7,846,495 | B2 | 12/2010 | Cha et al. |
| 8,014,120 | B2 | 9/2011 | Diederichs et al. |
| 8,629,464 | B2 | 1/2014 | Artiuch et al. |
| 9,030,329 | B2 | 5/2015 | Rutherford et al. |
| 9,681,381 | B2 | 6/2017 | Kang |
| 9,736,288 | B1 | 8/2017 | Parmar et al. |
| 9,949,316 | B2 | 4/2018 | Lindoff et al. |
| 2003/0196707 | A1 | 10/2003 | Meckes et al. |
| 2004/0163629 | A1 | 8/2004 | Strayer et al. |
| 2011/0248857 | A1* | 10/2011 | Rutherford ............ G08B 21/16 340/632 |
| 2013/0226485 | A1* | 8/2013 | Pietrowicz ............. H04L 43/06 702/62 |
| 2014/0019384 | A1* | 1/2014 | Hanley .................. G06Q 50/06 705/412 |
| 2014/0068719 | A1* | 3/2014 | Kiukkonen ......... H04W 12/003 726/4 |
| 2015/0276433 | A1 | 10/2015 | Brahmajosyula et al. |
| 2017/0221160 | A1* | 8/2017 | Elliott ..................... B67D 7/305 |
| 2017/0238328 | A1 | 8/2017 | Luong et al. |

OTHER PUBLICATIONS

"BLE Packet Structure", Nordic Developer Zone, Feb. 29, 2016, Downloaded.
"What is a Processor?—Definition from Techopedia", https://www.techopedia.com/definition/28254/processor, downloaded Apr. 28, 2018.
Duane A. Harris, "Determining Lost and Unaccounted for Gas Loss", Flow-Cal, Inc., Downloaded Aug. 11, 2017.
"Application Insight: GasMicro Electronic Volume Corrector"; Galvanic Applied Sciences, Inc., Jun. 2015.
"Gas Volume Corrector", Wikipedia, https://en.wikipedia.org/wiki/Gas_volume_corrector, downloaded Aug. 24, 2017.
Gas Micro, "Electronic Volume Corrector (EVC), Electronic Pressure Record (EPR), 3-Channel Electronic Recorder (ER)", Actaris Metering Systems, downloaded Aug. 11, 2017.
"Lost and Unaccounted for Gas", ICF International, Prepared for Massachusetts Department of Public Utilities, Dec. 23, 2014.
"Corus Gas Volume Converter", Itron, France, 2012.
"Mesh Model, Bluetooth Specification", Mesh Working Group, Revision: v1.0, Revision Date: Jul. 13, 2017.
"Mesh Networking", Wikipedia, https://en.wikipedia.org/wiki/Mesh_networking, downloaded Apr. 28, 2018.
"Transducer", Wikipedia, https://en.wikipedia.org/wiki/Transducer, downloaded May 15, 2018.

* cited by examiner

SAFETY INCIDENT DETECTION AND REPORTING THROUGH A CONNECTED EVC (ELECTRONIC VOLUME CORRECTOR)

CROSS-REFERENCE TO PROVISIONAL PATENT APPLICATION

This patent application claims priority under 35 U.S.C. 119(e) to U.S. Provisional Patent Application Ser. No. 62/574,991 entitled "Safety Incident Detection and Reporting Through a Connected EVC (Electronic Volume Corrector)," which was filed on Oct. 20, 2017, the disclosure of which is incorporated herein by reference in its entirety.

TECHNICAL FIELD

Embodiments are related to the field of safety monitoring and reporting in industrial and hazardous environments. Embodiments also relate to electronic volume correctors and gas distribution and industrial metering stations. Embodiments additionally relate to sensors such as gas leak sensors, and pressure and temperature sensors employed in industrial and hazardous environments such as gas distribution and/or industrial metering stations. Embodiments also relate to wireless communications networks and devices.

BACKGROUND

An EVC (Electronic Volume Corrector) is a type of gas volume corrector that calculates, sums, and determines increments of gas volume, measured by a gas meter if it were operating under base conditions. An EVC can use as input the gas volume, measured by a gas meter and other parameters such as, for example, gas pressure and temperature. An EVC may be employed in some situations for the settlement of trade wholesale gas.

There are generally two types of gas volume correctors. The first type is a gas volume corrector with specific types of transducers for pressure and temperature or temperature only. This type of gas volume corrector is typically powered by a battery. The second type is a device that converts separate transmitters with external temperature and pressure, or temperature only and for separate calculator, which may be approved separately.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved safety monitoring system and method.

It is another aspect of the disclosed embodiments to provide for EVC (Electronic Volume Corrector) components and devices for use in gas distribution and/or industrial metering stations.

It is still another aspect of the disclosed embodiments to provide for a mesh communications network.

It is yet another aspect of the disclosed embodiments to provide for notifications to technicians regarding potential safety problems in gas distribution and/or industrial metering stations.

The aforementioned aspects and other objectives and advantages can now be achieved as described herein. Safety monitoring systems and methods are disclosed, including a mesh communications network and an EVC (Electronic Volume Corrector) installed in one or more gas distribution components and/or industrial metering components in a gas distribution station and/or an industrial metering station. A group of sensors can be configured, which include at least a gas leak sensor, a pressure transducer, a temperature transducer, and an intrusion sensor. The sensors are located within the gas distribution station and/or industrial metering station. The sensors communicate wirelessly with the EVC and the gas distribution and/or industrial metering components through the mesh communications network.

The mesh communications network is preferably implemented as a bidirectional wireless data communications network. In some example embodiments, such a bidirectional wireless data communications network can be configured as a BLE (Bluetooth Low Energy) communications network composed of a group of BLE communications components arranged in a mesh architecture. Each sensor, for example, can be configured as a BLE enabled sensor capable of communicating with the BLE communications network.

The disclosed embodiments thus utilize an EVC installed in the gas distribution as a gateway to a number of features and functions, such as, for example, collecting information regarding gas leaks, fire, and equipment tampering and intrusion in a gas distribution station or in an industrial metering station. The EVC installed in the gas distribution station or industrial metering station also functions as a gateway to collect pressure/temperature and other process variable levels from various locations of the station (e.g., before and after pressure regulation).

In some example embodiments, the data collection frequency can be periodic and/or "on demand" and in some cases based on a subscription. The EVC (or EVC's) form a BLE mesh with the aforementioned BLE enabled sensors to perform this data collection. Once the data is collected, the EVC can perform necessary validations to ensure that the sensed data is within preferred warning alarm limits. In the case of any out of range values and/or alarm conditions, the EVC will immediately send/transmit the related information to a centralized cloud (e.g., to a server associated with a "cloud based" network). A notification cloud "app" or application can then forward the condition information or status to an appropriate technician and management team as per the configuration. In the case of any safety critical condition, the EVC can send a BLE message to shut down a shut off valve associated with the gas distribution station/industrial metering station and inform the same to a technician.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. As used herein, the term "and/or" includes any and all combinations of one or more of the associated listed items.

Reference will be made in detail to the disclosed embodiments (exemplary embodiments) of the invention, examples of which are illustrated in the accompanying drawings, and which may be preferred or alternative embodiments. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected.

Figure 1:
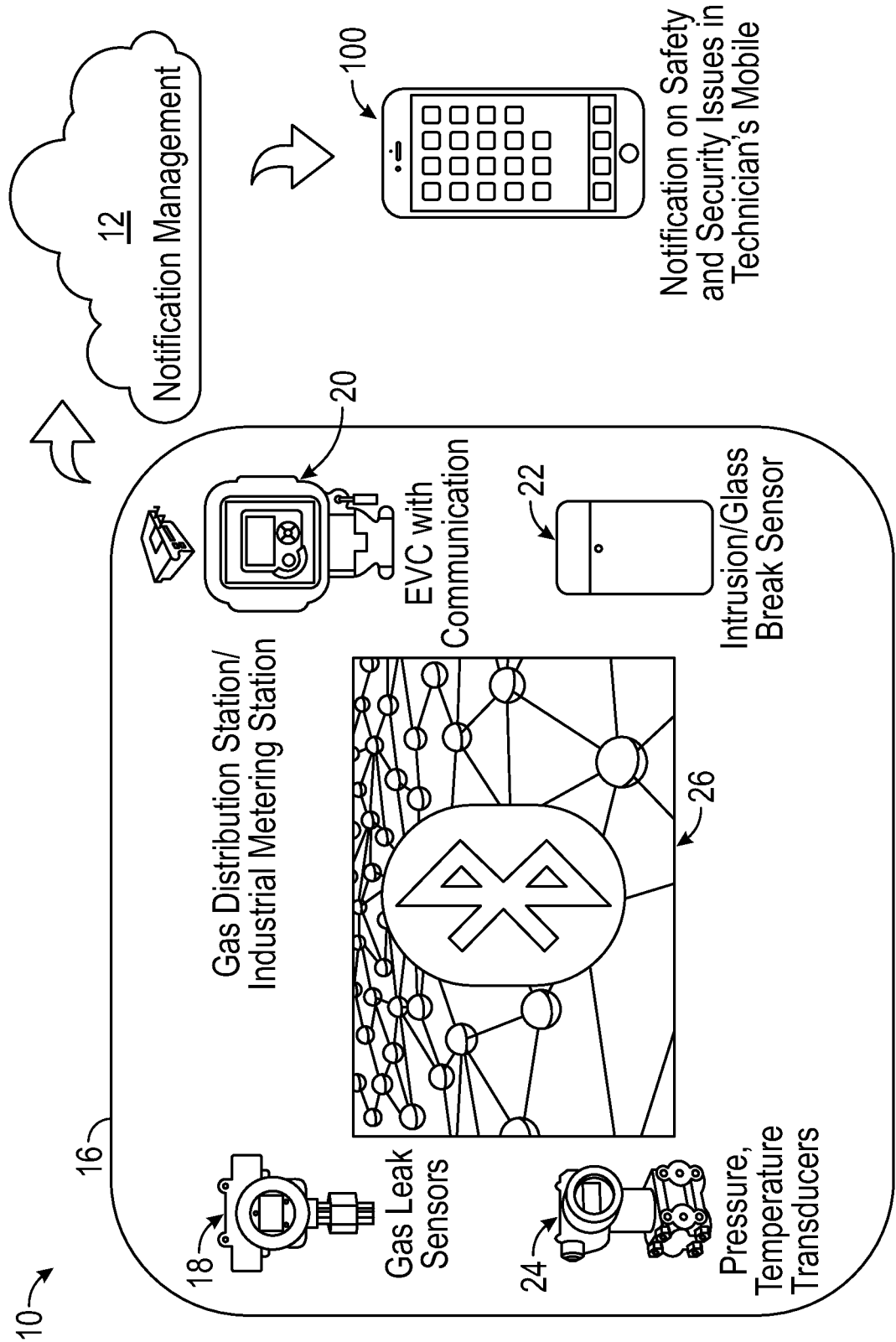
FIG. 1 illustrates a schematic diagram of a system for safety detection and reporting through a connected EVC (Electronic Volume Corrector), in accordance with an example embodiment.

FIG. 1 illustrates a schematic diagram of a system 10 for safety detection and reporting through a connected EVC (Electronic Volume Corrector), in accordance with an example embodiment. The system 10 includes a station 16 composed of a group of gas leak sensors such as a gas leak sensor 18, a pressure/temperature sensor 24 (e.g., pressure/temperature transducer), and an intrusion sensor 22 (e.g., intrusion/glass break sensor), which can communicate via wireless communications 26 with one another and/or another EVC 20 installed at the station 16 (i.e., a gas distribution station and/or an industrial metering station). The station 20 is preferably configured or installed with a connected EVC.

Note that the sensor 24 can be implemented as only a pressure sensor or only a temperature sensor or a combination of both a pressure sensor and a temperature sensor. The sensor 24 is preferably configured in the context of a transducer. The term "transducer" as utilized herein generally refers to a device that converts variations in a physical quantity, such as pressure or temperature or other physical quantities, into an electrical signal, or vice versa. The term "transducer" as utilized herein can also refer to a device that converts energy from one form to another or which converts a signal in one form of energy to a signal in another.

The EVC installed in the station 20 equipment can be utilized as a gateway that collects information regarding, for example, gas leaks, and fire equipment tampering and intrusion with respect to the station 16. This information is collected from the various example sensors 18, 22, and 24 via wireless communications 26. Thus, pressure, temperature, and other process variables can be collected from various locations of the station 16 (e.g., before and after pressure regulation).

The wireless communications 26 can be implemented as or facilitated by, for example, a BLE (Bluetooth Low Energy) mesh network, and each of the sensors 18, 22, 24 and so on can be implemented as BLE enabled sensors or devices that perform data collection. Note that the BLE mesh network 26 (i.e., a form of wireless communications) can broadcast BLE packets.

Bluetooth is a wireless technology for short-range communication. Accordingly, use of cables to connect devices to each other is rendered unnecessary. For example, a cellular phone or a laptop computer having a Bluetooth function may be connected to a wireless communication network without having to use a cable connection. All digital devices, including printers, mobile devices (e.g., smartphones, tablet computing devices, Personal Digital Assistants (PDAs), wearable computing devices, etc.), desktop computers, FAX machines, keyboards, and joysticks may be a part of a Bluetooth network such as the BLE network 26. In addition to removing the necessity of using cable connections, Bluetooth may also be used to form an interface between an existing data network and peripheral devices and also form a special group between devices which are located far from a fixed network infrastructure.

Note that the term "mesh network" as utilized herein refers generally to a type of local network topology in which the infrastructure nodes (e.g., bridges, switches and other infrastructure devices) connect directly, dynamically and non-hierarchically to as many other nodes as possible and cooperate with one another to efficiently route data from/to clients. This lack of dependency on one node allows for every node to participate in the relay of information. Mesh networks dynamically self-organize and self-configure, which can reduce installation overhead. The ability to self-configure enables dynamic distribution of workloads, particularly in the event that a few nodes should fail. This in turn contributes to fault-tolerance and reduced maintenance costs.

Bluetooth provides a strong wireless connection based on quick recognition and the use of a frequency hopping method. A Bluetooth module can prevent interference with other signals by hopping to a new frequency after transmission or reception of a packet. Compared to other systems which operate within the same frequency range, Bluetooth uses a specially short and fast packet. Since Bluetooth version 4.0, which has all functions provided by classic Bluetooth, Bluetooth high speed, and Bluetooth Low Energy (BLE), has been released, there has been growth in BLE technology. Note that an example of a BLE system that can be adapted for use in accordance with an example embodiment is disclosed in U.S. Patent Application Publication No. 20170238328, entitled "Acquisition Threshold based on Signal Strength," which published on Aug. 17, 2017 and is incorporated herein by reference in its entirety.

The data collection frequency can be periodic and/or "on demand" and/or in some cases based on a subscription. The EVC 20 forms the BLE mesh network with the aforementioned BLE enabled sensors 18, 22, 24 and so on to perform the necessary data collection. Once the data is collected, the EVC 20 can perform necessary validations to ensure that the sensed data is within particular or necessary warning/alarm limits.

In the case of any out of range values/alarm conditions, the EVC 20 can immediately send the related information to a centralized "cloud" or network 12 (e.g., notification management) and a notification cloud application (i.e., an "app") can then forward the condition to an appropriate technician and/or management team as per the configuration. In the case of any safety critical conditions, the EVC can send a BLE message to shut down the shut off valve and inform the same to, for example, a technician. The app is an application, typically a small, specialized program downloaded onto a mobile device such as, for example, the mobile device 100. For example, the mobile device 100 may be a smartphone that a technician uses.

Notifications regarding safety and security issues can thus be transmitted to the technician's mobile device from the EVC 20 through the "cloud," where the transmission and display of such notifications via the device 100 are facilitated by the app. An example of such an app includes, for example, the apps 106, 108 and so on shown in FIG. 2. The app 106, for example, may be the notification cloud application or "app" discussed herein.

Figure 2:
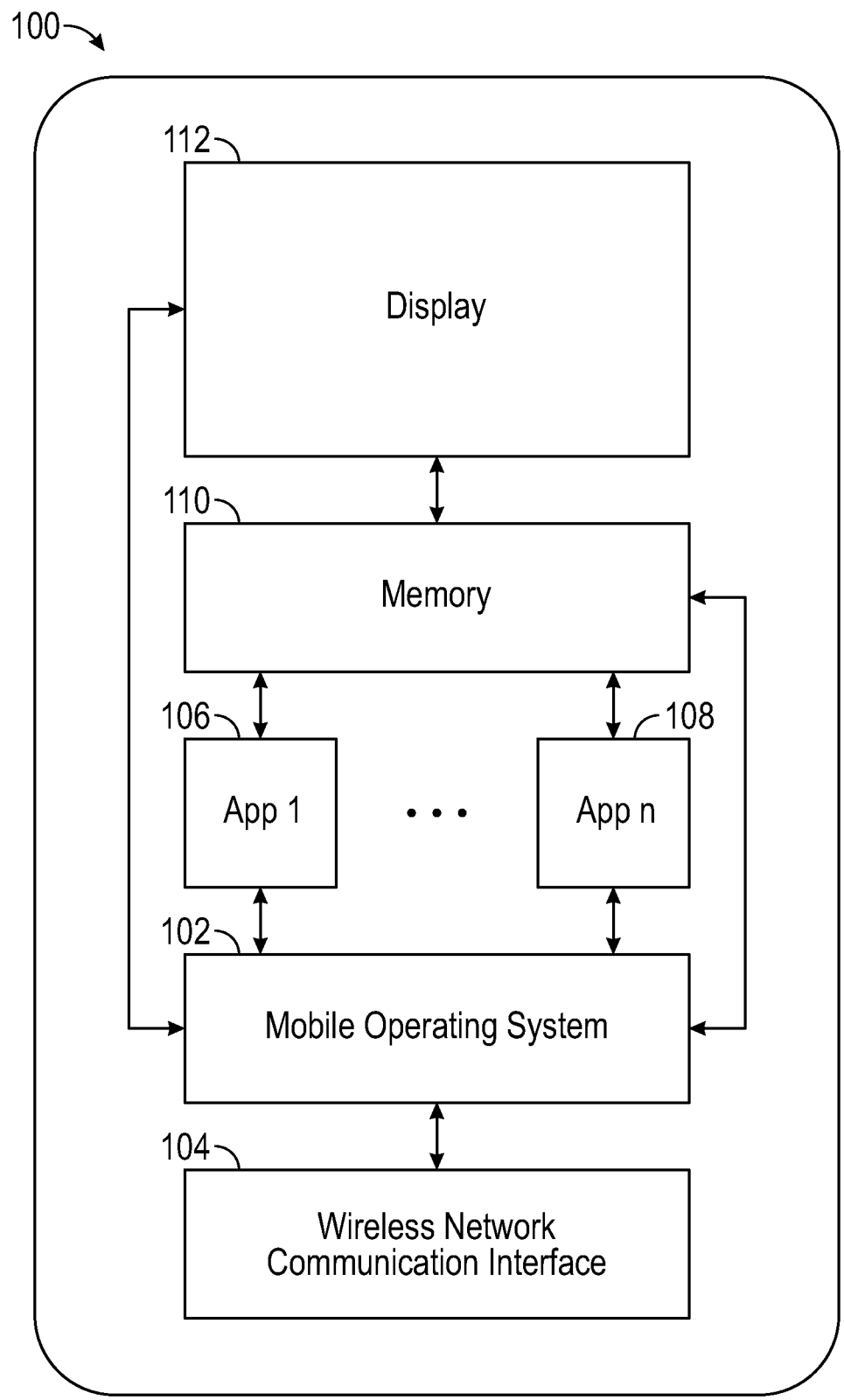
FIG. 2 illustrates a block diagram illustrating an example embodiment of a mobile device, in accordance with an example embodiment.

FIG. 2 illustrates a block diagram illustrating an example embodiment of the mobile device 100. In the disclosed example, the mobile device 100 (e.g., a mobile phone, tablet, or other mobile device) generally operates according to a mobile operating system 102 running on a processor (not shown). Mobile network connectivity can be provided via a wireless network communication interface 104, which can be configured to transmit and receive information via a wireless radiotelephone subsystem that includes an antenna, transceiver, and associated components to provide wireless communication connectivity via a mobile network to other mobile devices and to networked computers, such as computer servers, via the Internet and/or other networks.

Note that the term "processor" as utilized herein can refer to an integrated electronic circuit that performs the calculations that run a computer or other data-processing system or device. A processor performs arithmetical, logical, input/output (I/O) and other basic instructions that are passed from an operating system (OS). Most other processes are dependent on the operations of a processor. The terms processor, CPU and microprocessor are commonly linked and in some cases may refer to the same device or system. The term "processor" as utilized may also in some example embodiments refer to an arithmetical logic and control unit (CU), which measures capability in terms of, for example, the ability to process instructions at a given time, the maximum number of bits/instructions, and/or the relative clock speed. The term "processor" in some example embodiments may also refer to a microcontroller or other controlling unit, or in some cases a combination of a controller and a processor such as a combined microprocessor and controller devices.

A set of mobile applications (which sometimes individually or collectively are referred to as a "mobile app" or "app"), represented in FIG. 2 by mobile app 106 and mobile app 108, are stored on the mobile device 100 on a storage drive (e.g., memory) or other persistent storage device (not shown) and each is configured to run on top of mobile operating system 102, including by invoking services of mobile operating system 102 to communicate via wireless network communication interface 104 with remote resources, such as application servers running applications and/or services with which the mobile app is associated. Note that the term "app" as utilized herein thus refers generally to a "mobile app" that constitutes a computer program configured to run on a mobile communications device, such as, for example, a smartphone or tablet computing device or wearable computing device such as a watch. An app is typically configured as a software application downloadable to such a mobile communications device. The words "app" and "mobile app" can be utilized interchangeably to refer to the same feature or application.

Mobile operating system 102 and mobile apps 106 and 108 have access to and use a memory 110 to store and retrieve data. For example, mobile operating system 102 may allocate to each app 106 and 108, a region of memory 110 (or another memory component) to be used by that app (or apps) to store app-related data. Similarly, each app 106 and 108 may be allocated a set of logical locations in a persistent storage managed by mobile operating system 102 (e.g., an app-specific directory in a file system used by mobile operating system 102 to manage persistently stored objects).

Mobile operating system 102 can be connected to and manages app interactions with a display subsystem 112. Display subsystem 112 (sometimes "display") includes a touch-sensitive display device, for example, a capacitive or other display able to generate and provide to mobile operation system 102 signals representative of single and/or multi-touch gestures, such as swiping (and the direction thereof), pinching in or out, dragging, and dropping. A mobile app such as app 106 or app 108 may be configured to display app display pages, e.g., app user interface pages, content display pages, etc., via display 112. A mobile app also may be configured to receive user input provided via display 112, e.g., selection, dragging, dropping, and/or other user input associated with physical interactions with the touch-sensitive surface of display 112.

A mobile app, such as app 106 or app 108 of FIG. 2, typically provides access to app functionality via a mobile app user interface displayed via a display device of the mobile device. Information and/or user interactive controls may be displayed. Users may access further functionality and/or control the manner in which functionality is provided and/or the content displayed by performing touches and/or gestures (e.g., select an object, activate a button or other control, drag an object to a new location, drag an object to a location associated with a control input, such as dragging a file icon to a folder to add the file to the folder, etc.) Typically, mobile users navigate through successive pages of a mobile app's interface. However, typically to reach a previously-viewed mobile app page it is necessary to navigate back to that page, which requires the mobile app to regenerate the desired page and any intervening pages through which the user must navigate to get back to the desired page. Typically, a mobile app only has a single currently active page, i.e., the one currently being displayed.

Figure 3:
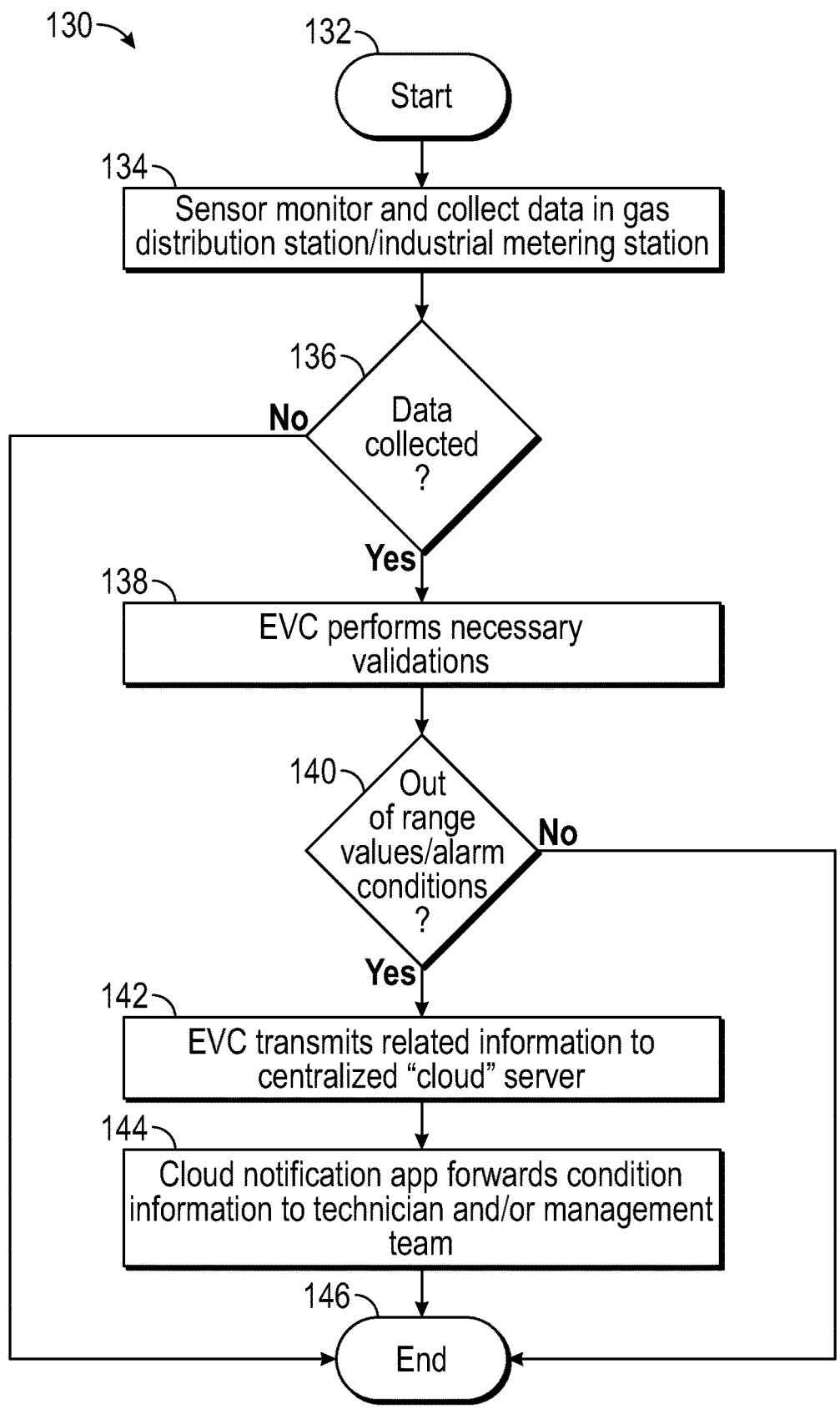
FIG. 3 illustrates a high level flow chart of operations illustrating logical operational steps of a method for safety monitoring of a gas distribution station and/or industrial material station, in accordance with an example embodiment.

FIG. 3 illustrates a high level flow chart of operations illustrating logical operational steps of a method 130 for safety monitoring of a gas distribution station and/or industrial material station, in accordance with an example embodiment. As indicated at block 132, the process begins. Then, as shown at block 134, a step or operation can be implemented in which one or more sensors (e.g., a gas leak sensor, a fire sensor, an equipment tampering sensor, an intrusion sensor, a glass break sensor, pressure sensor, temperature sensor, and so on) collect information regarding, for example, gas leaks, fire, equipment tampering, and intrusion, etc. Such sensors can be configured as BLE enabled sensors. Pressure and/or temperature transducers and other types of sensors, for example, can collect pressure and temperature data and other process variable levels from various locations about the gas distribution station and/or industrial metering station (before and after pressure regulation, for example). As indicated previously, the data collection frequency can be periodic and/or "on demand" and in some cases based on a subscription.

Next, as shown at decision block 136, a test operation can be implemented to determine if the desired sensor data has been collected. If not, then the process terminates, as indicated at block 146. If, however, it is determined that the sensor data has been collected, then as indicated at block 138, the EVC (which forms the aforementioned BLE mesh with the above mentioned BLE enabled sensors to perform this data collection) performs the necessary validations to ensure that the sensed data is within preferred warning/alarm limits.

In the case of any out of range values/alarm conditions, as indicated at decision block 140, the EVC can then immediately transmit the related information to a centralized cloud (i.e., to a cloud-based server), as shown at block 142, where such data or information can be stored in a memory location of such a server and/or subject to further processing by a processor associated with such a server (or in some cases, a group of servers). Next, as shown at block 144, a notification cloud "app" can forward the condition information to an appropriate condition and/or management team as per the configuration.

Note that in the case of any safety critical condition, the EVC can transmit a BLE message to shut down a shut off valve associated with the gas distribution station and/or industrial metering station and also inform the same to a technician or management team. The process then terminates, as shown at block 146.

As can be appreciated by one skilled in the art, embodiments can be implemented in the context of a method, data processing system, or computer program product. Accordingly, embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object-oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on a user's, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network, or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of, for example, a general-purpose computer, special-purpose computer, or other programmable data processing apparatus to produce a machine, such that the instructions, which execute via the processor of the computer or other programmable data processing apparatus, create means for implementing the functions/acts specified in the block or blocks. To be clear, the disclosed embodiments can be implemented in the context of, for example, a special-purpose computer or a general-purpose computer, or other programmable data processing apparatus or system. For example, in some embodiments, a data processing apparatus or system can be implemented as a combination of a special-purpose computer and a general-purpose computer.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative example embodiments, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
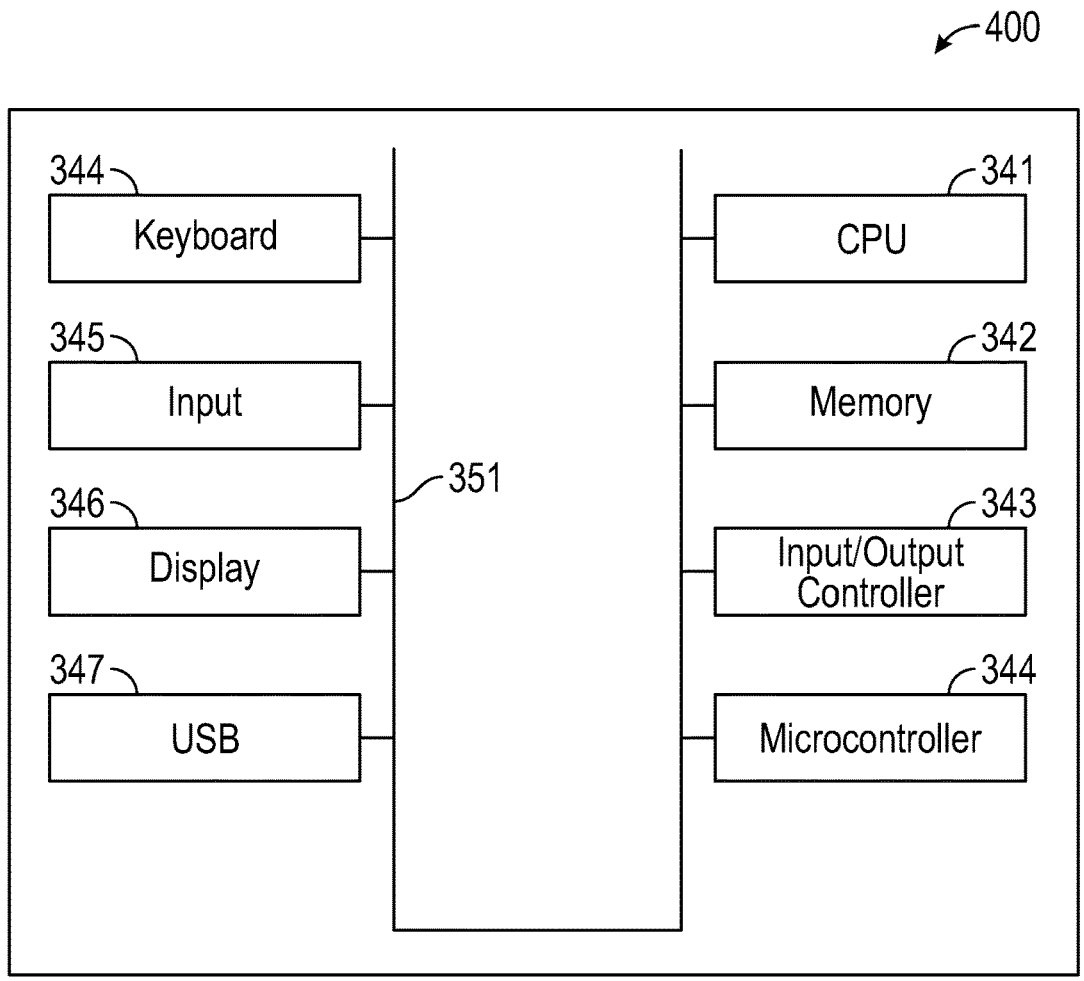
FIG. 4 illustrates a schematic view of a computer system/apparatus, which can be implemented in accordance with an example embodiment.
Figure 5:
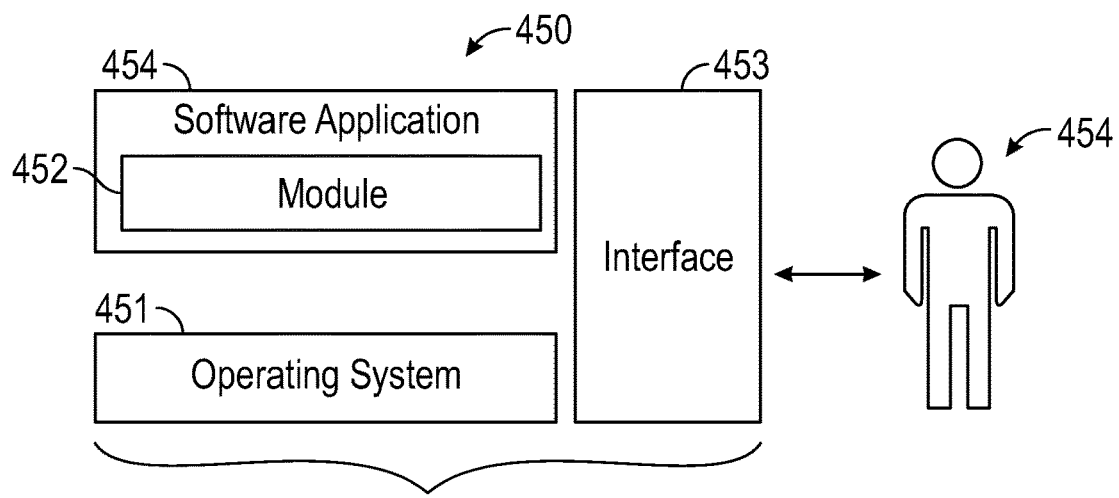
FIG. 5 illustrates a schematic view of a software system including a module, an operating system, and a user interface, which can also be implemented in accordance with an example embodiment.

FIGS. 4-5 are shown only as exemplary diagrams of data-processing environments in which example embodiments may be implemented. It should be appreciated that FIGS. 4-5 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 4, some example embodiments may be implemented in the context of a data-processing system/apparatus 400 that can include, for example, one or more processors such as a processor 341 (e.g., a CPU (Central Processing Unit) and/or other microprocessors), a memory 342, an input/output controller 343, a microcontroller 332, a peripheral USB (Universal Serial Bus) connection 347, a keyboard 344 and/or another input device 345 (e.g., a pointing device, such as a mouse, track ball, pen device, etc.), a display 346 (e.g., a monitor, touch screen display, etc.), and/or other peripheral connections and components. In some example embodiments, the data-processing system/apparatus 400 can be implemented as a mobile computing device such as the device/system 100 shown in FIG. 2. In some example embodiments, the data-processing system/apparatus 400 may be implemented as a computing device such as a computer server, desktop computer and so on, which communicates through a wireless communications network with devices such as the device 100 discussed previously herein.

As illustrated, the various components of data-processing system/apparatus 400 can communicate electronically through a system bus 351 or similar architecture. The system bus 351 may be, for example, a subsystem that transfers data between, for example, computer components within data-processing system/apparatus 400 or to and from other data-processing devices, components, computers, etc. The data-processing system/apparatus 400 may be implemented in some embodiments as, for example, a server in a client-server based network (e.g., the Internet) or in the context of a client and a server (i.e., where aspects are practiced on the client and the server). The data-processing system/apparatus 400 may be implemented in some embodiments as, for example, a server and/or a personal computer, a mobile device (e.g., smartphone, tablet computing device, laptop computer, etc.), and/or other computing devices or systems, etc.

In other example embodiments, data-processing system/apparatus 400 may be, for example, a standalone desktop computer, a laptop computer, a smartphone, a pad computing device and so on, wherein each such device is operably connected to and/or in communication with a client-server based network or other types of networks (e.g., cellular networks, Wi-Fi, etc.).

FIG. 5 illustrates a computer software system/apparatus 450 for directing the operation of the data-processing system/apparatus 400 depicted in FIG. 4. Software application 454, stored for example in memory 342, generally includes a module 452 (as discussed in further detail herein). The computer software system/apparatus 450 further includes a kernel or operating system 451 and a shell or interface 453. One or more application programs, such as software application 454, may be "loaded" (i.e., transferred from, for example, mass storage or another memory location into the memory 342) for execution by the data-processing system/apparatus 400. The data-processing system/apparatus 400 can receive user commands and data through the interface 453; these inputs may then be acted upon by the data-processing system/apparatus 400 in accordance with instructions from operating system 451 and/or software application 454.

The interface 453 in some example embodiments can serve to display results, whereupon a user 459 may supply additional inputs or terminate a session. The software application 454 can include module(s) 452, which can, for example, implement the various instructions or operations such as those discussed herein with respect to FIG. 3 and elsewhere herein. Module 452 may also be composed of a group of modules or sub-modules that implement particular instructions, steps, or operations, such as discussed and illustrated herein with respect to FIG. 3 and elsewherein. The module 452 may include instructions (e.g., steps or operations) for implementing and operating an "app" or "mobile app" as discussed herein. Examples of such instructions include, for example, the instructions, steps or operations of method 130 shown in blocks 132, 134, 136, 138, 140, 142, 144, and 146 in FIG. 3.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" can constitute a software application, but can also be implemented as both software and hardware (i.e., a combination of software and hardware).

Generally, program modules include, but are not limited to, routines, subroutines, software applications, programs, objects, components, data structures, etc., that perform particular tasks or implement particular data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 4-5 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a group of microprocessors, one or more microprocessors in conjunction with a DSP core, or any other such configuration. Alternatively, some steps or methods may be performed by circuitry that is specific to a given function. For example, some example embodiments may be implemented in the context of a special-purpose computer instead of a general-purpose computer or vice versa.

It should also be appreciated that the use of the unique features and components and embodiments discussed herein offer improvements to the underlying technology such as the overall networking system and/or ability for sensors to communicate with another. For example, the unique methodology and components described herein such as as shown in FIGS. 1, 2, 3, 4 and 5 allow for faster communications among devices (such as among the sensors, the device 100 and so on) and increased energy savings (e.g. battery, power, etc) by facilitating improved communications among, for example, sensors, 18, 22, 24, the EVC 20, the device 100, and so on. A mesh network such as described herein, for example, facilitates such improved communications, power savings, and processing time due to the unique features of a mesh network, as described herein.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module executed which may reside on a computer-readable medium. Computer-readable media includes both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The disclosed embodiments offer a number of benefits. For example, a hot-redundant MST system is capable of overtaking failures and handling unplanned maintenances. This approach can also ensure fail-safe circumstances in liquid hydrocarbon product O&M (Operations and Maintenance) and secure process uptime. In addition, the disclosed approach can result in no shutdowns or process breakdowns. The disclosed redundant probe can also reduce the downtime for future breakdown/unplanned/scheduled maintenance. Existing and new customers will also find the disclosed dual option in a single installation attractive due to minimal maintenance expenditure and accuracy, accurate process measurement, and the fact that human interference and corresponding errors will be considerably reduced.

Based on the foregoing, it can be appreciated that a number of example embodiments are disclosed herein. For example, in one embodiment, a safety monitoring system (e.g, such as the system 10) can be implemented, which includes at least one electronic volume corrector such as EVC 20 installed in at least one gas distribution component in a gas distribution station, and a plurality of sensors (e.g., such as sensors 18, 22, 24, and so on) located within the gas distribution station, such that the plurality of sensors communicates wirelessly with the electronic volume corrector and the at least one gas distribution component through a mesh communications network (e.g., such as the network 26 shown in FIG. 1). The aforementioned sensors can include, for example, one or more gas leak sensors, a pressure transducer, a temperature transducer, an intrusion sensor, and so on.

In some example embodiments, the mesh communications network can be configured as a bidirectional wireless communications network. In still other example embodiments, the aforementioned bidirectional wireless communications network can be a BLE (Bluetooth Low Energy) communications network composed of a plurality of BLE communications components arranged in a mesh architecture, wherein each sensor among the plurality of sensors comprises a BLE enabled sensor configured to communicate with the BLE communications network.

In some example embodiments, the gas distribution component (or components) can constitute industrial metering equipment. In still other example embodiments, the aforementioned intrusion sensor can be a glass break sensor (e.g., such as the sensor 22 shown in FIG. 1). In some example embodiments, the aforementioned sensors can collect data periodically. In still other example embodiments, such sensors can collect data in an on demand manner. In another example embodiment, the aforementioned sensors can collect data according to a subscription and particular parameters established as a part of such a subscription.

In another example embodiment, the EVC performs validations with respect to sensed data collected by the plurality of sensors (or one or more of such sensors) to ensure that the sensed data is within a warning limit and/or an alarm limit. In yet another example embodiment, if any range values and/or alarm conditions with respect to the warning limit and/or the alarm limit are out of a preferred range, the EVC can transmit the related information wirelessly to a server for storage in a memory of the server and/or for processing by a processor associated with the server. In another example embodiment, if a safety critical condition is identified, the EVC sends a BLE message to a shut off valve associated with the gas distribution component to shut off the gas distribution component.

In another example embodiment, a safety monitoring system can be implemented which includes: an electronic volume corrector that is installed in one or more gas distribution components in a gas distribution station; and one or more sensors (or a group of sensors) located within the gas distribution station, such that the plurality of sensors communicates wirelessly with the electronic volume corrector and the one or more gas distribution components through a mesh communications network. Such sensors can include, for example, at least a gas leak sensor, a pressure transducer, a temperature transducer, an intrusion sensor and/or other types of sensors. The mesh communications network can be configured as a bidirectional wireless communications network.

In yet another example embodiment, a safety monitoring method can be implemented which includes steps or operations such as installing an electronic volume corrector in one or more gas distribution component in a gas distribution station; and locating a plurality of sensors (e.g., a group of sensors) within the gas distribution station, such that the plurality of sensors communicates wirelessly with the electronic volume corrector and the one or more gas distribution component through a mesh communications network as discussed previously herein.

The preceding description of the disclosed embodiments is provided to enable any person skilled in the art to make or use such embodiments. Various modifications to these embodiments will be readily apparent to those skilled in the art, and the generic principles defined herein may be applied to other embodiments without departing from the spirit or scope of the invention. Thus, the disclosed embodiments are not intended to be limited to the embodiments shown herein but are to be accorded the widest scope consistent with the following claims and the principles and novel features disclosed herein.

The invention claimed is:

1. A safety monitoring system, comprising:
an electronic volume corrector (EVC) installed in at least one gas distribution component in a gas distribution station; and
a plurality of sensors located within said gas distribution station, wherein said plurality of sensors communicates wirelessly with said electronic volume corrector and said at least one gas distribution component through a mesh communications network, wherein said EVC performs validations with respect to sensed data collected by said plurality of sensors to ensure that said sensed data is within a warning limit and/or an alarm limit,
wherein said plurality of sensors collects said sensed data before and after a pressure regulation of said at least one gas distribution component, and
wherein when any range values and/or alarm conditions with respect to said warning limit and/or said alarm limit are out of a preferred range, said EVC transmits related information wirelessly to a server for storage in a memory of said server and/or for processing by a processor associated with said server.

2. The system of claim 1 wherein said plurality of sensors comprises at least a gas leak sensor, a pressure transducer, a temperature transducer, and an intrusion sensor.

3. The system of claim 1 wherein said mesh communications network comprises a bidirectional wireless communications network.

4. The system of claim 3 wherein said bidirectional wireless communications network comprises a wireless short range low energy communications network comprising a plurality of wireless short range low energy communications components arranged in a mesh architecture and wherein each sensor among said plurality of sensors comprises a wireless short range low energy enabled sensor configured to communicate with said wireless short range low energy communications network.

5. The system of claim 1 wherein said at least one gas distribution component further comprises industrial metering equipment.

6. The system of claim 1 wherein said intrusion sensor comprises a glass break sensor.

7. The system of claim 1 wherein said plurality of sensors collects data periodically.

8. The system of claim 1 wherein said plurality of sensors collects data in an on demand manner.

9. The system of claim 1 wherein said plurality of sensors collects data according to a subscription and particular parameters established as a part of said subscription.

10. The system of claim 1 wherein when a safety critical condition is identified, the EVC sends a wireless short range low energy communications message to a shut off valve associated with said at least one gas distribution component to shut off said at least one gas distribution component.

11. A safety monitoring system, comprising:
an electronic volume corrector (EVC) installed in at least one gas distribution component in a gas distribution station; and
a plurality of sensors located within said gas distribution station, wherein said plurality of sensors communicates wirelessly with said electronic volume corrector and said at least one gas distribution component through a mesh communications network, wherein said plurality of sensors comprises at least a gas leak sensor, a pressure transducer, a temperature transducer, and an intrusion sensor and said mesh communications network comprises a bidirectional wireless communications network, wherein said EVC performs validations with respect to sensed data collected by said plurality of sensors to ensure that said sensed data is within a warning limit and/or an alarm limit, wherein said plurality of sensors collects said sensed data before and after a pressure regulation of said at least one gas distribution component, and wherein when any range values and/or alarm conditions with respect to said warning limit and/or said alarm limit are out of a preferred range, said EVC transmits related information wirelessly to a server for storage in a memory of said server and/or for processing by a processor associated with said server.

12. The system of claim 11 wherein said bidirectional wireless communications network comprises a wireless short range low energy communications network comprising a plurality of wireless short range low energy communications components arranged in a mesh architecture and wherein each sensor among said plurality of sensors comprises a wireless short range low energy communications enabled sensor configured to communicate with said BLE communications network.

13. The system of claim 11 wherein said at least one gas distribution component further comprises industrial metering equipment, and said intrusion sensor comprises a glass break sensor and wherein said plurality of sensors collects data periodically.

14. The system of claim 13 wherein said plurality of sensors collects data in an on demand manner and wherein said plurality of sensors collects data according to a subscription and particular parameters established as a part of said subscription.

15. A safety monitoring method, comprising:
installing an electronic volume corrector (EVC) in at least one gas distribution component in a gas distribution station;
locating a plurality of sensors within said gas distribution station, wherein said plurality of sensors communicates wirelessly with said electronic volume corrector and said at least one gas distribution component through a mesh communications network; and performing validations by said EVC with respect to sensed data collected by said plurality of sensors to ensure that said sensed data is within a warning limit and/or an alarm limit, collecting with said plurality of sensors, said sensed data before and after a pressure regulation of said at least one gas distribution component, and when any range values and/or alarm conditions with respect to said warning limit and/or said alarm limit are out of a preferred range, transmitting from said EVC, related information wirelessly to a server for storage in a memory of said server and/or for processing by a processor associated with said server.

16. The method of claim 15 wherein said plurality of sensors comprises at least a gas leak sensor, a pressure transducer, a temperature transducer, and an intrusion sensor.

17. The method of claim 15 wherein said mesh communications network comprises a bidirectional wireless communications network and wherein said bidirectional wireless communications network comprises a wireless short range low energy communications network comprising a plurality of wireless short range low energy communications components arranged in a mesh architecture and wherein each sensor among said plurality of sensors comprises a wireless short range low energy communications enabled sensor configured to communicate with said wireless short range low energy communications network.

* * * * *